United States Patent
Longoni

(10) Patent No.: US 7,606,686 B2
(45) Date of Patent: Oct. 20, 2009

(54) REACTOR DOSIMETRY APPLICATIONS USING A PARALLEL 3-D RADIATION TRANSPORT CODE

(75) Inventor: Gianluca Longoni, Pittsburgh, PA (US)

(73) Assignee: Westinghouse Electric Co LLC, Cranberry Township, PA (US)

( * ) Notice: Subject to any disclaimer, the term of this patent is extended or adjusted under 35 U.S.C. 154(b) by 0 days.

(21) Appl. No.: 12/237,429

(22) Filed: Sep. 25, 2008

(65) Prior Publication Data
US 2009/0084974 A1  Apr. 2, 2009

Related U.S. Application Data

(60) Provisional application No. 60/975,525, filed on Sep. 27, 2007.

(51) Int. Cl.
*G06F 17/10* (2006.01)
*G01T 1/00* (2006.01)
*G01T 3/00* (2006.01)

(52) U.S. Cl. ............................. 703/2; 703/6; 250/390.03

(58) Field of Classification Search ............ 250/390.03, 250/484.3, 486.1; 376/154, 254; 703/2, 703/6, 23
See application file for complete search history.

(56) References Cited

U.S. PATENT DOCUMENTS

| | | | |
|---|---|---|---|
| 4,666,662 | A | 5/1987 | Loose et al. |
| 2004/0009455 | A1 | 1/2004 | Chiang et al. |
| 2005/0089831 | A1 | 4/2005 | Russell et al. |
| 2006/0285640 | A1 | 12/2006 | Nizin et al. |

FOREIGN PATENT DOCUMENTS

WO    WO 93/10538    5/1993

OTHER PUBLICATIONS

Longoni, Advanced Quadrature Sets, Acceleration and Preconditioning Techniques for the Discrete Ordinates Method in Parallel Computing Environments. Dissertation, University of Florida, 2004. pp. xvi-xvii, 1-2, 5-6, 8-9, 12-14, 20-21, 86-87, 115, 120, 125, 128-133, 136, 138, 145, 156-157.

*Primary Examiner*—David P Porta
*Assistant Examiner*—Mark R Gaworecki

(57) ABSTRACT

The invention relates generally to a method for the calculation of radiation field distributions employing a new parallel 3-D radiation transport code and, a multi-processor computer architecture. The code solves algorithms using a domain decomposition approach. For example, angular and spatial domains can be partitioned into subsets and, the subsets can be independently allocated and processed.

15 Claims, 6 Drawing Sheets

COMPARISON OF RAPTOR-M3G SPEED-UP OBTAINED WITH
DIFFERENT DOMAIN DECOMPOSITION STRATEGIES

US 7,606,686 B2

REACTOR DOSIMETRY APPLICATIONS USING A PARALLEL 3-D RADIATION TRANSPORT CODE

CROSS-REFERENCE TO RELATED APPLICATIONS

This provisional patent application claims priority to U.S. Provisional Patent Application No. 60/975,525, which was filed on Sep. 27, 2007.

BACKGROUND OF THE INVENTION

1. Field of the Invention

The present invention relates generally to the calculation of radiation field distributions, and is particularly useful in predicting neutron-dosimetry responses for nuclear reactor cavities and internal components.

2. Background Information

Various methodologies can be used to obtain numerical solutions of the Linearized Boltzmann Equation (LBE) for neutron and gamma radiation transport applications. The discrete ordinates method ($S_N$) is one such methodology used, in particular, in the nuclear engineering field. The numerical solution of the $S_N$ equations is achieved through the concurrent discretization of the phase space, i.e., angular, spatial and energy domains. The concurrent discretization of the phase space leads to a large number of unknowns in the $S_N$ equations and therefore, extensive computational resources are required to solve this problem.

For large 3-D neutron and gamma transport applications, the main memory required to generate a numerical solution of the LBE using $S_N$ equations may exceed current computational capabilities of a typical single-processor workstation. For example, the solution of a full 3-D neutron transport problem for a typical 2-loop Pressurized Water Reactor (PWR), characterized by approximately 1.5 million spatial meshes, an $S_8$ quadrature set, a $P_3$ expansion of the scattering kernel, and 47-neutron energy groups, can lead to a main memory requirement of approximately 45 GByte. The significant computational resources required may preclude the use of single-processor workstations to solve such problems.

It would be desirable to overcome these difficulties, by developing a new solution algorithm(s) for the $S_N$ equations to take advantage of multi-processor computing architectures, i.e., distributed memory architectures. For example, it would be desirable to configure a number of physically independent workstations linked together via a network backbone, to establish what is generally referred to as a cluster computing environment. This type of computing platform has found widespread applications in recent years especially in the fields of scientific computing and large scale numerical simulation. However, it is necessary to devise specialized algorithms in order to exploit the capabilities of a cluster environment.

Thus, there is room for improvement in a set of solution algorithms for the $S_N$ equations to take advantage of multi-processor computing architectures. There is also room for improvement in a methodology to obtain numerical solutions of the LBE for the calculation of radiation field distributions such as neutron and gamma radiation field distributions. Moreover, there is room for improvement of a methodology to predict dosimetry responses in an accurate and efficient manner for application in nuclear reactors.

SUMMARY OF THE INVENTION

A method for calculating a radiation field distribution, comprising applying a 3-D radiation transport computer code, said code comprising domain decomposition algorithms including domains selected from the group consisting of angular and spatial domains, wherein said domains are allocated and processed independently on a multi-processor computer architecture.

A computer program for calculating a radiation field distribution. The program including a code segment that when executed divides the angular and spatial domains into subsets, independently allocates the subsets, and processes the subsets on a multi-processor architecture.

DESCRIPTION OF THE PREFERRED EMBODIMENTS

Figure 1A:
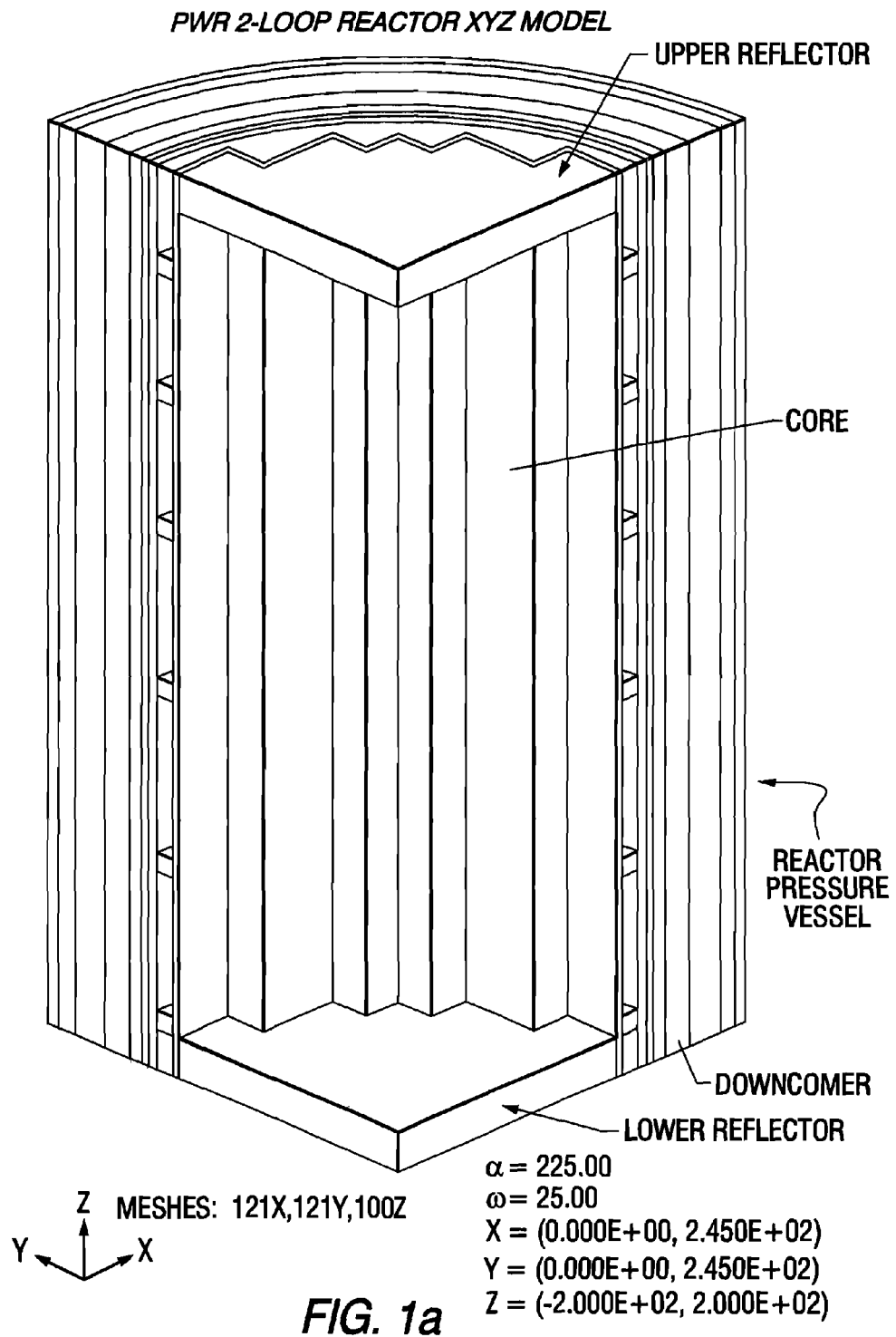
FIG. 1a shows the geometry and material distribution of a 3-D transport model for a 2-loop PWR.

The present invention relates to a method of calculating radiation field distribution for a system. The radiation fields can include neutron and gamma radiation. In an aspect of the invention, ex-vessel neutron dosimetry responses in the cavity of a nuclear reactor can be calculated. The type of nuclear reactor is not limiting and can include a variety of commercial designs known in the art. Suitable reactors can include but are not limited to Pressurized Water Reactors (PWRs) and Boiling Water Reactors (BWRs). For simplicity of disclosure, this aspect of the invention will be described with reference to a 2-loop commercial PWR. Computer modeling of the PWR to generate dosimetry responses are used in the design and operation of the PWR.

The method of the present invention includes application of a 3-D parallel radiation transport code referred to herein as RAPTOR-M3G (RApid Parallel Transport Of Radiation—Multiple 3D Geometries). The transport code provides a set of parallel algorithms for solving the $S_N$ equations. The method is based on domain decomposition algorithms, where the spatial, angular and/or energy domains are partitioned into subsets which can be independently allocated and processed on a multi-processor architecture. Examples of suitable 3-D parallel deterministic transport codes which are known include PENTRAN™ and PARTISN (Sjoden G. E. and Haghighat A., "PENTRAN—Parallel Environment Neutral-particle TRANport in 3-D Cartesian Geometry," Proceedings of the Joint International Conference on Mathematical Methods and Supercomputing for Nuclear Applications, Vol. 1, pp.

232-234, Saratoga Springs, N.Y. (1997)). As compared to traditional single-processor applications, the method of the present invention reduces the computational load as well as the memory requirement per processor, yielding an efficient solution methodology for large 3-D problems.

The RAPTOR-M3G computer code is developed in Fortran 90 using the Message Passing Interface (MPI) parallel libraries. (Gropp W., Lusk E., and Skjellum A., Using MPI Portable Parallel Programming with the Message Passing Interface, The MIT Press, Cambridge, Mass. (1999)). Several features of the RAPTOR-M3G include the following:

Solution of the multi-group $S_N$ equations on 3-D Cartesian (RAPTOR-XYZ) and cylindrical geometries (RAPTOR-RTZ) (M. A. Hunter, G. Longoni, and S. L. Anderson, "Extension of RAPTOR-M3G to r-θ-z geometry for use in reactor dosimetry applications," Proceedings of the 13th International Symposium on Reactor Dosimetry, The Netherlands (2008)) on non-uniform orthogonal structured meshes;

Spatial, angular, and coupled spatial/angular domain decomposition algorithms;

Positive definite weighted differencing schemes: Zero/Theta Weighted, and Directional Theta Weighted;

Automatic generation of level-symmetric quadrature sets up to order 20 (Longoni G. et al., "Investigation of New Quadrature Sets for Discrete Ordinates Method with Application to Non-Conventional Problems," Transactions of the American Nuclear Society, Vol. 84, pp. 224-226 (2001));

Parallel memory: allows local allocation of the spatial and angular sub-domains, therefore reducing the memory requirements per processor;

Parallel tasking: concurrent solution of the $S_N$ equations on multiple processors to reduce computational time as compared to single processor technology;

Parallel I/O: each processor locally accesses its storage devices to reduce I/O time; and Compatibility and integration with BOT3P (R. Orsi, "Potential Enhanced Performances in Radiation Transport Analysis on Structured Mesh Grids Made Available by BOT3P," Nuclear Science and Engineering, Vol. 157, pp. 110-116 (2007)), an automated mesh generator, and GIP, a multi-group cross-sections pre-processor.

FIG. 1a shows the geometry of a 3-D transport model for an embodiment of the present invention, e.g., a 2-loop PWR. The PWR can include a 12-foot nuclear core, thermal shield design, and a 3-inch reactor cavity air gap. The model geometry includes a core-water mixture, core shroud, core barrel, thermal shield, Reactor Pressure Vessel (RPV) including stainless-steel liner, and reflective insulation. The RPV of a PWR typically has a generally cylindrical shape and is closed at both ends, e.g., by a bottom head and a removable top head. The upper and lower internals regions above and below the reactor core are modeled using a steel-water mixture. The lower internals of the RPV include the core barrel (i.e., a core support structure). The core barrel is enclosed with the thermal shield between the core barrel and an inner wall of the RPV. In some instances, neutron pads are used in lieu of the thermal shield. The core shroud sets inside the core barrel. An annular downcomer surrounds the reactor core barrel. Cooling fluid, typically water, is circulated into the downcomer.

Figure 1B:
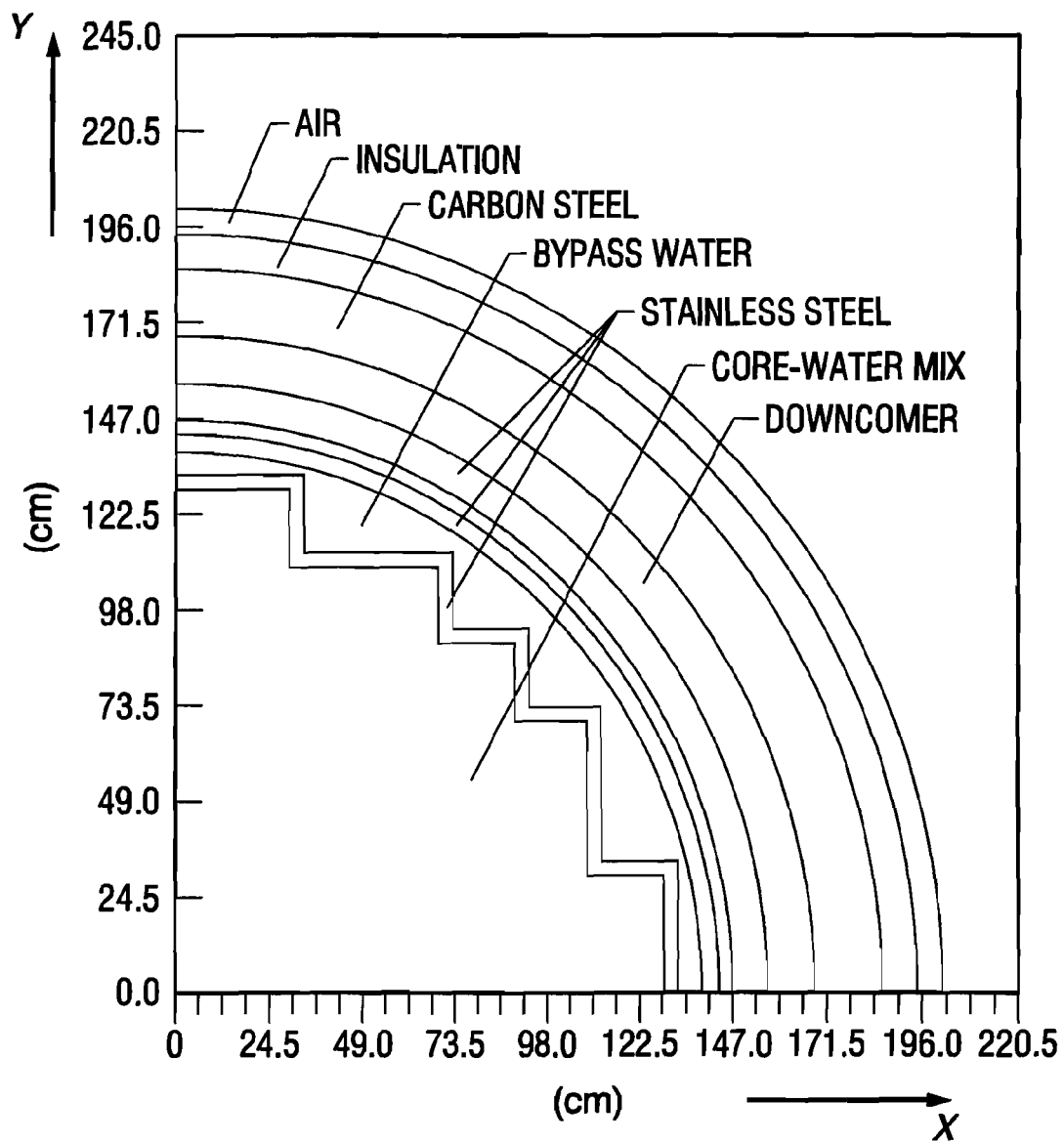
FIG. 1b shows a 2-D section of the model on the x-y plane at z=0.0 cm for a 2-loop PWR.

FIG. 1b shows a 2-D section of the model on the x-y plane at z=0.0 cm for a 2-loop PWR. Also shown is a material distribution in the PWR. The model geometry and the mesh discretization are generated using the BOT3P code, version 5.2. The model extends from 0.0 cm to 245.0 cm along the x-, and y-axis, and from −200.0 cm to 200.0 cm along the z-axis. A uniform mesh is applied throughout the model; a mesh size of 2.0×2.0×4.0 cm is specified along the x-, y- and z-axes, respectively, yielding a total of 1,464,100 meshes.

The cross sections for the material mixtures in the transport model are processed using the BUGLE-96 cross sections library (RSICC Data Library Collection BUGLE-96, "Coupled 47 Neutron, 20 Gamma-Ray Group Cross Section Library Derived from ENDF/B-VI for LWR Shielding and Pressure Vessel Dosimetry Applications," Oak Ridge National Laboratory, Oak Ridge, Tenn. (1999)) and the GIP computer code, part of the DOORS package (RSICC Computer Code Collection DOORS 3.2a, "One-, Two- and Three-Dimensional Discrete Ordinates Neutron/Photon Transport Code System," Oak Ridge National Laboratory, Oak Ridge, Tenn. (2003)). An $S_8$ level symmetric quadrature set and a $P_3$ spherical harmonics expansion of the scattering kernel is used for the transport calculations. A system of passive neutron detectors can be installed in the reactor cavity air gap between the reflective insulation and the pressure vessel. The dosimetry system can provide accurate information relative to the fast neutron exposure over the betline region of the reactor vessel. Pure metal foils can be installed in the reactor cavity, encased in an aluminum shell, which minimizes distortions of the fast neutron spectrum, effectively yielding a free-field measurement. The neutron dosimeters installed in the reactor cavity air gap are not explicitly defined in the transport model.

An aspect of the present invention includes a domain decomposition algorithm(s) for the discretization of the $S_N$ equations that uses an approach wherein the spatial and/or angular energy domains are partitioned into subsets which can be independently allocated and processed on multi-processor architectures.

The spatial and angular discretization of the $S_N$ equations, as well as the angular domain decomposition algorithm described herein is specific for the 3D Cartesian XYZ version of the code. The formulation of the $S_N$ equations developed for RAPTOR-RTZ is different from RAPTOR-XYZ due to the presence of the scattering redistribution term.

The phase space of the $S_N$ equations is discretized, i.e., angle, space and energy. Thus, the resulting set of linear algebraic equations is suitable for solution on a digital computer. The energy domain is discretized using the multigroup approach into a number of discrete intervals, i.e., g=1 . . . G, starting with the highest energy particles (g=1), and ending with the lowest (g=G). The transport equation (i.e., LBE) in the multigroup approximation is formulated in Eq. (1).

$$\hat{\Omega} \cdot \vec{\nabla} \psi_g(\vec{r}, \hat{\Omega}) + \sigma_g(\vec{r}) \psi_g(\vec{r}, \hat{\Omega}) = \quad (1)$$

$$\sum_{g'=1}^{G} \int_{4\pi} d\Omega' \sigma_{gg'}(\vec{r}, \hat{\Omega}' \cdot \hat{\Omega}) \psi_{g'}(\vec{r}, \hat{\Omega}') +$$

$$\frac{1}{k} \chi_g \sum_{g'=1}^{G} \nu \sigma_{f,g'}(\vec{r}) \phi_{g'}(\vec{r}) + q_g^e(\vec{r}, \hat{\Omega}).$$

The angular domain is discretized by considering a finite set of directions and by applying an appropriate quadrature integration scheme. Each discrete direction can be visualized as a point on the surface of a unit sphere with an associated surface area which mathematically corresponds to the weight of the quadrature scheme. The combination of the discrete directions and the corresponding weights is referred to as quadrature set. In general, quadrature sets must satisfy a number of conditions in order to be accurate and mathematically determined; several approaches can be employed, e.g. level-symmetric quadrature set (LQn) and Legendre polynomial based quadrature sets (Longoni G. and Haghighat A., "Development of New Quadrature Sets with the Ordinate Splitting Technique," Proceedings of the ANS International Meeting on Mathematical Methods for Nuclear Applications (M&C 2001), Salt Lake City, Utah, Sep. 9-13, 2001, American Nuclear Society, Inc., La Grange Park, Ill. (2001)). The quadrature sets developed and implemented in RAPTOR-M3G are based on the LQn method.

The spatial variable can be discretized with several techniques, e.g., finite difference and finite element methods. The formulation developed in RAPTOR-M3G is based on the finite difference approach which includes partitioning the spatial domain into computational cells, e.g., fine meshes, where the cross sections are assumed constant within each cell. In 3D Carstesian geometry, the angular flux at the cell-center location is evaluated using Eq. (2).

$$\psi_{i,j,k,m,g} = \frac{q_{i,j,k} + \frac{|\mu_m|}{a_{i,j,k,m,g}\Delta x}\psi_{in,x} + \frac{|\eta_m|}{b_{i,j,k,m,g}\Delta y}\psi_{in,y} + \frac{|\xi_m|}{c_{i,j,k,m,g}\Delta z}\psi_{in,z}}{\frac{|\mu_m|}{a_{i,j,k,m,g}\Delta x} + \frac{|\eta_m|}{b_{i,j,k,m,g}\Delta y} + \frac{|\xi_m|}{c_{i,j,k,m,g}\Delta z} + \sigma_{i,j,k}} \quad (2)$$

In Eq. (2), the angle and energy dependence are denoted by the indices m and g, respectively. The term $q_{i,j,k}$ represents the sum of the scattering, fission and external sources at cell-center. The indices i, j, k represent the cell-center values, and the weights $a_{i,j,k,m,g}$, $b_{i,j,k,m,g}$, and $c_{i,j,k,m,g}$ are restricted to the range between 0.5 and 1.0; RAPTOR-M3G utilizes the Theta-Weighted (TW), Zero-Weighted (ZW), or the adaptive Directional Theta Weighted (DTW) differencing schemes to calculate the weights during the transport sweep (B. Petrovic and A. Haghighat, "New Directional Theta-Weighted $S_N$ Differencing Scheme and Its Application to Pressure Vessel Fluence Calculations," Proceedings of the 1996 Radiation Protection and Shielding Topical Meeting, Falmouth, Mass., Vol. 1, pp. 3-10 (1996)).

The $S_N$ equations are solved by going through each direction starting from the boundary of the problem domain; this solution process is also referred to as transport sweep. The angular flux defined at center-cell locations is evaluated starting from boundary conditions or from the boundary angular flux previously calculated in adjacent cells. The cell-center angular flux is calculated using Eq. (2). The angular flux exiting the computational cell is calculated using additional relationships referred to as the "differencing schemes".

The transport sweep is performed within an iterative process which is termed source iteration, also known as fixed point iteration, or Richardson iteration. This process is continued until an appropriate convergence criterion is satisfied, i.e., the relative error on the scalar flux in any norm between two iterations is below a certain cutoff value (Adams M. L. and Larsen E. W., "Fast Iterative Methods for Discrete-Ordinates Particle Transport Calculations," Progress in Nuclear Energy, Vol. 40, n. 1 (2002)). For radiation shielding calculations this cutoff value is generally set to $1.0e^{-3}$ or $1.0e^{-4}$.

The parallel algorithms developed in RAPTOR-M3G are based on the decomposition of the angular and/or spatial domains on a network of processors. RAPTOR-M3G creates a virtual topology based a number of processors allocated to the angular and spatial domains, specified as $P_a$ and $P_s$ respectively. The total number of processors required for any decomposition is $P_n = P_a \cdot P_s$. Based on this information, the network of processors is mapped on the spatial and angular domains creating a virtual topology which associates each processor to its local sub-domain.

The angular domain is partitioned on an octant basis, where the processors specified on the angular domain, are sequentially assigned to the local octants. The local number of octants allocated per processor is given by Eq. (3).

$$N_{loct} = \frac{8}{P_a} \quad (3)$$

The transport sweep is locally performed on $N_{loct}$ octants on $P_a$ processors; an MPI communicator for the angular domain is used to synchronize the angular flux among processors and to account for reflective boundary conditions.

The spatial domain is partitioned along the z-axis by sequentially assigning the $P_s$ processors to a number of x-y planes. The total number of fine meshes along the z-axis, i.e., km, is partitioned on $P_s$ processors; a mapping array, i.e., kmloc, is used to assign the x-y planes to the $P_s$ processors. The number of x-y planes assigned to the $P_s$ processors is arbitrary; however, the condition in Eq. (4) needs to be satisfied in order to define a spatial decomposition that is topologically consistent with the problem geometry.

$$\sum_{i=1}^{P_s} kmloc(i) = km \quad (4)$$

The flexibility to map the processors on the spatial domain to an arbitrary number of x-y planes can depend on the fact that the number of z-planes may not be exactly divisible by the number of processors on the spatial domain. An uneven partitioning of the x-y planes on the $P_s$ processors can lead to processor load imbalance with consequent loss in performance. In the present invention, a hybrid angular/spatial decomposition strategy may be applied to overcome this difficulty. The hybrid decomposition includes the combination of the angular and spatial domains to include concurrent partitioning of these domains. Hybrid domain decomposition is further described in the Example 1 below.

Figure 5:
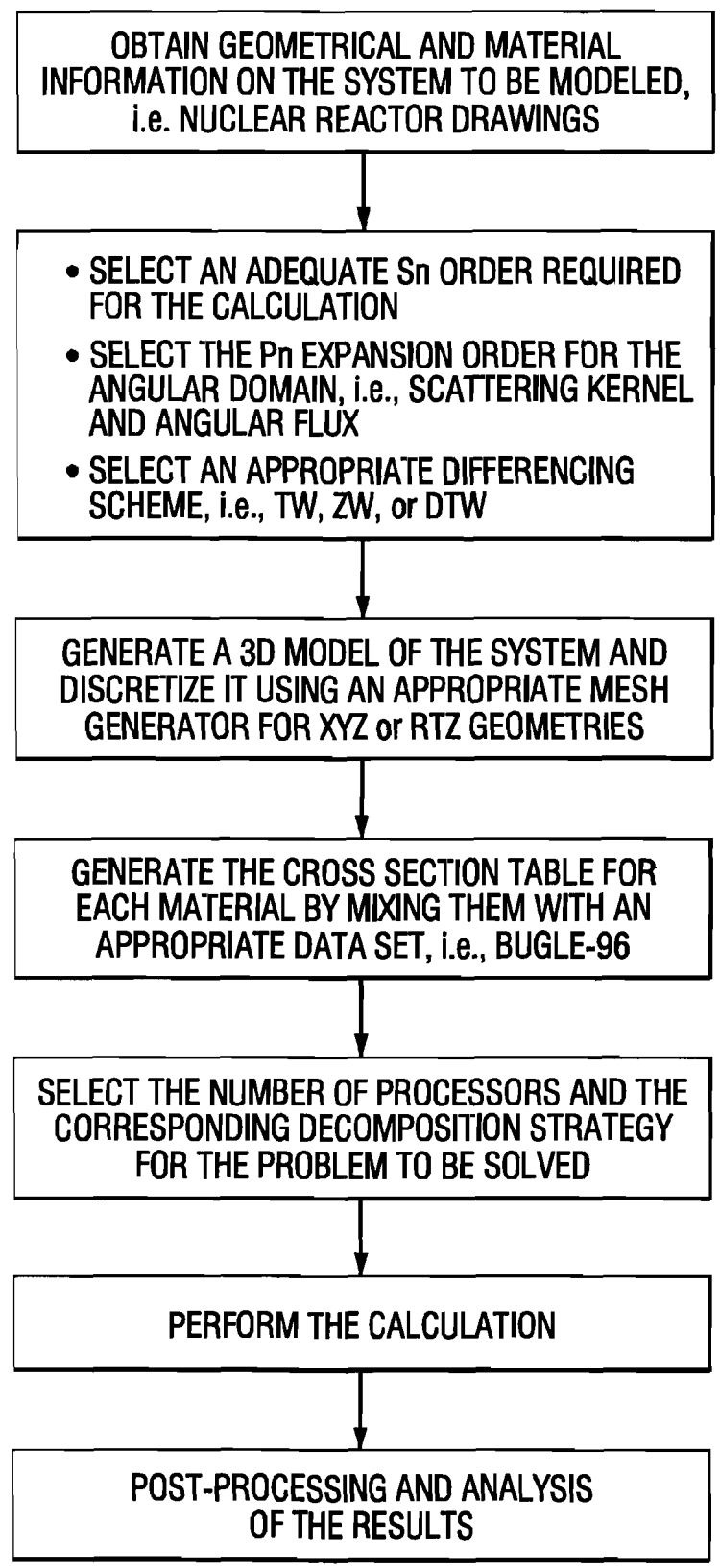
FIG. 5 shows a flow chart of an embodiment of the present invention, wherein the 3-D radiation transport computer program is implemented to generate a radiation field distribution.

FIG. 5 shows a flow chart of an embodiment of the present invention, wherein the 3-D radiation transport computer program is implemented to generate a radiation field distribution. This embodiment includes obtaining geometrical and material information on the system to be modeled. The information can be obtained from various sources such as but not limited to nuclear reactor drawings. An adequate $S_N$ order required for the calculation can then be selected. Further, the $P_n$ expansion order to the angular domain (i.e., scattering kernel and angular flux) can be selected. An appropriate differencing scheme (i.e., TW, ZW or DTW) can be selected as well. A 3-D model of the system can be generated and discretized using an appropriate mesh generator for the Cartesian XYZ or RTZ geometries. A cross section table is generated for each material by mixing them with an appropriate data set such as BUGLE-96. The number of processors and the corresponding decomposition strategy is selected for the problem to be solved. The calculation is then performed. Following calculation, post-processing and analysis of the results generated may occur.

The RAPTOR-M3G computer code used in the present invention provides an accurate and efficient (e.g., reduced computational time) solution of radiation transport problems. In an aspect of the present invention, ex-vessel neutron dosimetry responses are calculated for a cavity in a nuclear reactor vessel. In comparison with actual measurements, the fast neutron reactions in the reactor cavity air gap of a 2-loop PWR calculated by RAPTOR-M3G were 96% accurate on average. Further, solution of the transport problem was obtained in approximately 106 minutes of clock time on a 20-processor computer cluster using a hybrid angular/spatial domain decomposition strategy.

While specific embodiments of the invention have been described in detail, it will be appreciated by those skilled in the art that various modifications and alternatives to those details could be developed in light of the overall teachings of the disclosure. For instance, an aspect of the present invention described herein relates to the nuclear industry and in particular, nuclear reactors. However, the present invention can also be used in a wide range of other applications such as the medical field. For example, the present invention can be used to determine the dose of radiation delivered to a patient for the treatment and/or cure of cancer. Accordingly, the particular arrangements disclosed are meant to be illustrative only and not limiting as to the scope of the invention which is to be given the full breadth of the appended claims and any and all equivalents thereof.

EXAMPLES

Example 1

RAPTOR-M3G Parallel Performance Analysis

The transport calculations discussed in the Examples were performed with RAPTOR-M3G running on a 20 processors computer cluster, i.e., EAGLE-1. The cluster was composed of 5 nodes with 2 dual-core dual processor AMD Opteron 64-bit architecture. The cluster total memory, i.e., RAM, available was 40 GByte; the network interconnection was characterized by 1 GBit/s bandwidth. With this hardware configuration, RAPTOR-M3G completed a full 3D transport calculation for a 2-loop PWR in approximately 106 minutes on 20 processors. No significant differences in performance were observed using the DTW, TW, or ZW differencing schemes.

Figure 4:
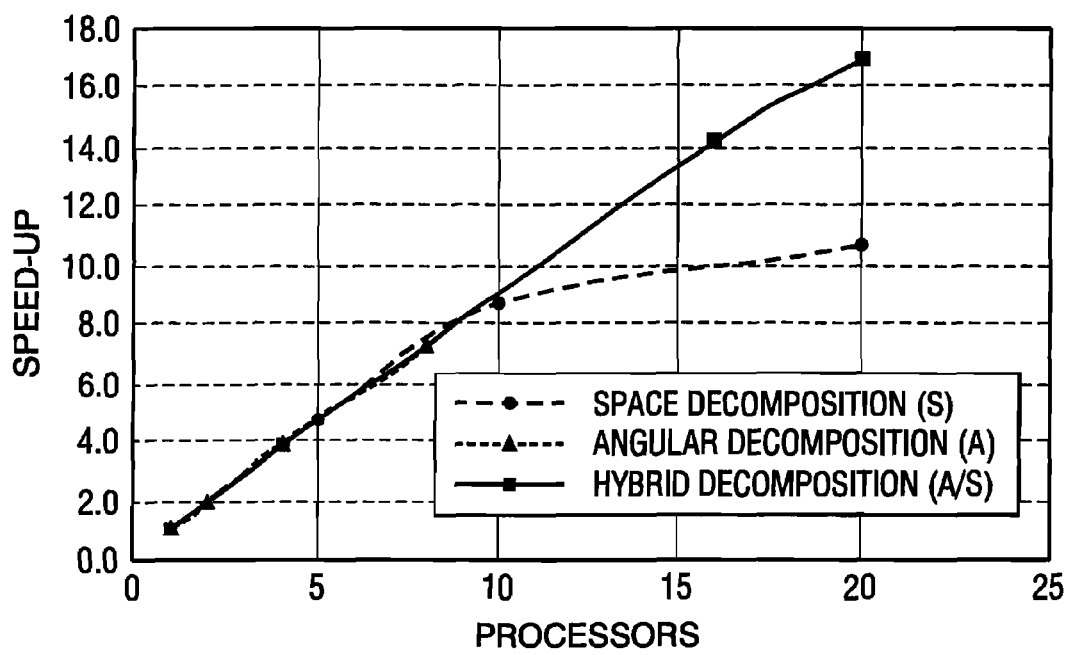
FIG. 4 shows the speed-up obtained for a range of processors (e.g., up to 20) using different domain decomposition strategies.

Moreover, a simple test problem was set up to analyze the parallel performance of the code. The test problem consisted of 50×50×50 cm box with a uniform distributed fixed source, discretized with a 1 cm uniform mesh. An S8 quadrature set and P0 isotropic scattering was used, along with a one energy group cross section set. The wall-clock time, speed-up, and parallel efficiency were used to evaluate the parallel performance of RAPTOR-M3G. Speed-up and parallel efficiency were defined as in Eqs. 5 and 6, respectively.

$$S_p = T_s / T_p \quad (5)$$

$$\eta_p = S_p / N_p \quad (6)$$

wherein, $T_s$ and $T_p$ are the wall-clock times required by the single-processor and multi-processor calculations, respectively. $N_p$ is the number of processors utilized to achieve the wall-clock time $T_p$. FIG. 4 shows a comparison of the speed-up obtained up to 20 processors using different decomposition strategies.

The speed-up obtained with the space decomposition was progressively reduced as the number of processors was increased. It was believed that this behavior was due to a finer computational granularity per processor; as the space domain was decomposed into smaller sub-domains, the number of operation per processor was reduced while the inter-processor communication time was increased; therefore leading to a reduced performance. The network data transfer among the nodes was generally the limiting factor on distributed memory architectures. The larger number of iterations required to converge the problem further contributed to reduce the performance of the space decomposition strategy. However, the hybrid decomposition where the angular and spatial domains were concurrently partitioned yielded better results. It was believed that this behavior was due to the coarser computational granularity induced by this decomposition; also for the hybrid decomposition, the number of iterations required to converge the problem did not increase as much as the space decomposition.

Example 2

Comparison of Measured Dosimetry Responses with RAPTOR-M3G Calculated Responses

A comparison was conducted between measured dosimetry responses and corresponding predictions obtained with RAPTOR-M3G. The IRDF-2002 Dosimetry Library (I. Kodeli and A. Trkov, "Validation of the IRDF-2002 Dosimetry Library," Nuclear Instruments and Methods in Physics Research Section A: Accelerators, Spectrometers, Detectors and Associated Equipment, Vol. 57, Issue 3, pp. 664-681 (2007)) was used to generate the calculated dosimetry responses for the neutron reactions listed in Table 1.

Measured dosimetry responses for the reactions listed in Table 1 were compared with the responses calculated by RAPTOR-M3G.

TABLE 1

Neutron Reactions Measured By The Dosimetry System

| Material | Reaction |
|---|---|
| Copper | $^{63}Cu(n,\alpha)^{60}Co$ |
| Iron | $^{54}Fe(n,p)^{54}Mn$ |
| Nickel | $^{58}Ni(n,p)^{58}Co$ |
| Uranium | $^{238}U(n,f)^{137}Cs$ |
| Neptunium | $^{237}Np(n,f)^{137}Cs$ |

The reactions listed in Table 1 were measured using Cadmium shielded metal foils; therefore, the thermal component of the neutron spectrum was suppressed.

The measured responses were obtained at four azimuthal locations, i.e., 0°, 15°, 30°, and 45° at core mid-plane in the reactor cavity air gap. Since 2-loop PWR reactors are generally characterized by peak fast neutron fluence at the 0° position, due to close proximity of the nuclear fuel with the RPV, additional measurement were obtained at this location. Specifically at 0°, measurements were obtained axially at the top and bottom of the active core. Initially the calculated dosimetry responses were found to consistently over-predict the measured data.

Further investigation revealed that the RPV thickness used in the transport model was smaller than what was being measured during the In-Service Inspection (ISI) of the Reactor Pressure Vessel (RPV), confirming the initial findings. The new RPV thickness was introduced into the transport model, and the accuracy of the calculated dosimetry data improved on average by ~8%. The measured vs. calculated (M/C) ratios of the dosimetry data calculated using the DTW adaptive differencing scheme are shown in FIG. 2.

Figure 2:
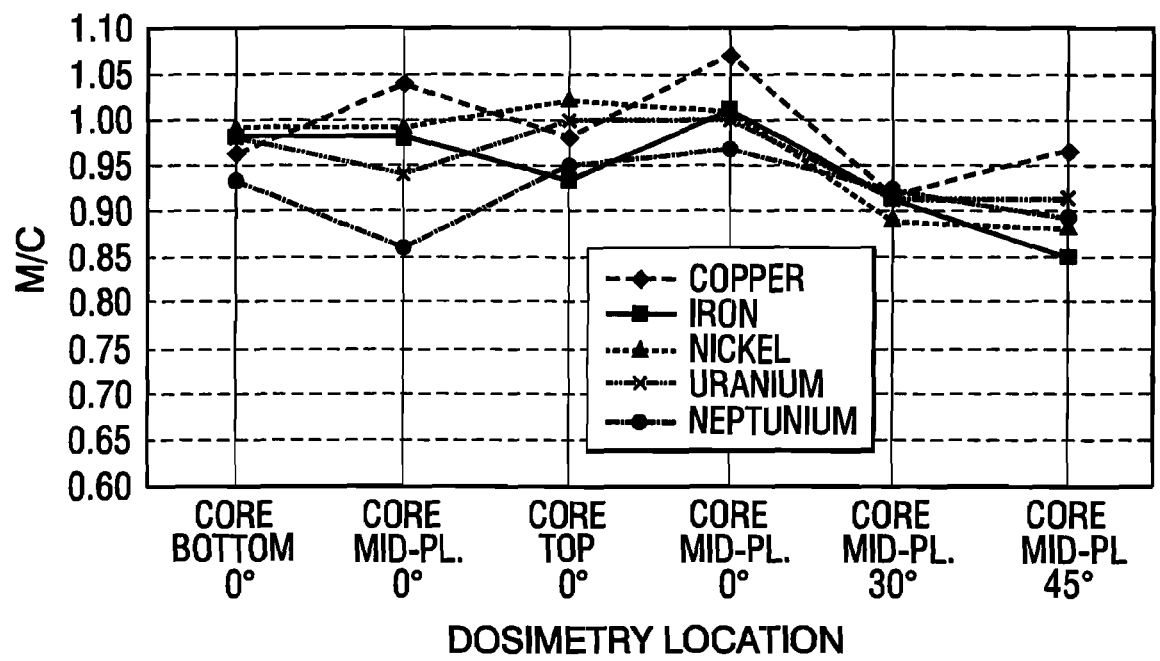
FIG. 2 shows the measured versus calculated (M/C) ratios of the dosimetry data calculated using the Directional Theta Weighted adaptive differencing scheme.

As shown in FIG. 2, the M/C ratios were consistently located within a 10% range at each location and for every dosimetry material. The over-prediction at the 30° and 45° azimuthal positions could be reduced by using a non-uniform mesh refinement at these locations, where the curvature of the system becomes more relevant. The average NIC ratio over all dosimetry locations was 0.96.

Figure 3A:
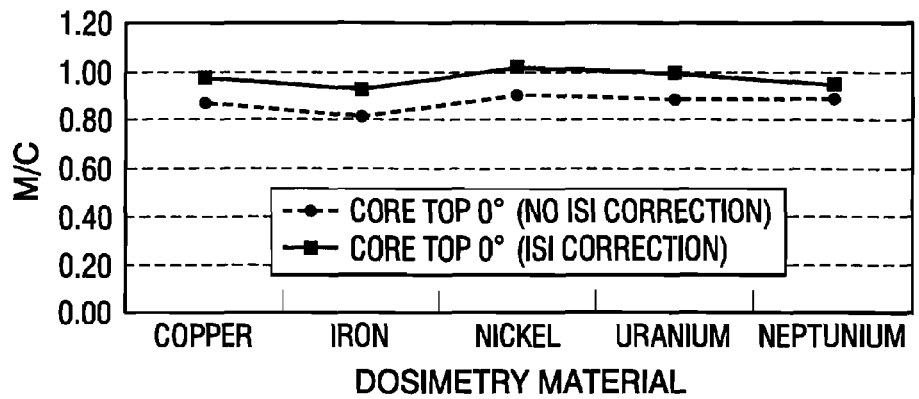
FIGS. 3a, 3b and 3c show the M/C ratios for a corrected reactor pressure vessel having a corrected thickness as compared to a non-corrected thickness for the core top location (3a), the core mid-plane location (3b) and the core bottom location (3c).
Figure 3B:
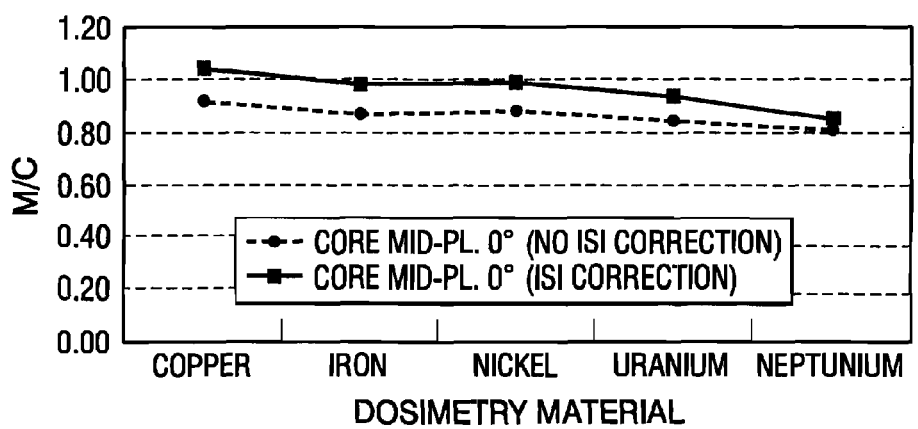
Figure 3C:
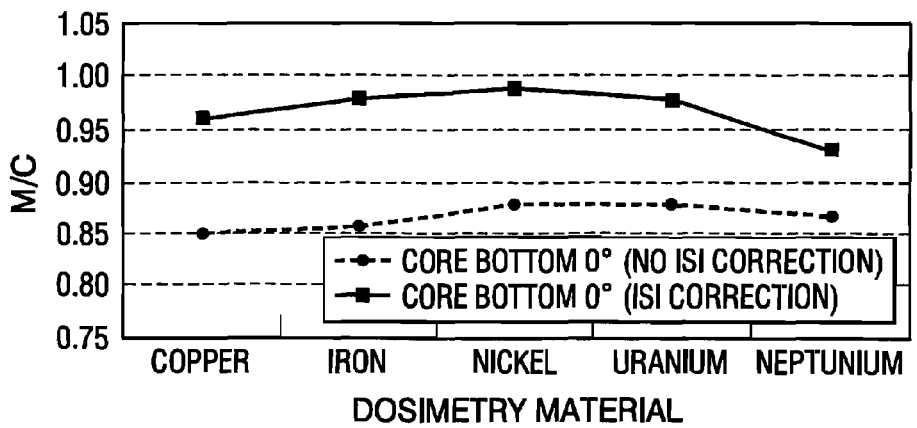

FIGS. 3a through 3c present the N/C values obtained with the ISI-corrected RPV thickness as compared to the value obtained without the thickness correction. The comparison was conducted and presented for all the dosimetry specimens located at the 0° azimuthal location. The corrected RPV thickness using the ISI measurements improved the accuracy of the calculated responses at every dosimetry location. Similar results were obtained also at 15°, 30°, and 45° azimuthal locations.

The measured and calculated reaction rates at each dosimetry location, and the M/C ratio using the RPV thickness corrected with ISI measurements are shown in Table 2. The average M/C ratio for the reactions listed in Table 2 across all the dosimetry locations was 0.96.

TABLE 2

Measured and Calculated Reaction Rates Obtained with the DTW Differencing Scheme

| Reaction | Core Bottom Capsule 0° | | | Core Mid-Plane Capsule 0° | | |
|---|---|---|---|---|---|---|
| | Measured | Calculated | M/C | Measured | Calculated | M/C |
| $^{63}Cu(n,\alpha)^{60}Co$ | 3.83E−19 | 3.99E−19 | 0.96 | 1.07E−18 | 1.03E−18 | 1.04 |
| $^{54}Fe(n,p)^{54}Mn$ | 3.60E−17 | 3.66E−17 | 0.98 | 9.41E−17 | 9.60E−17 | 0.98 |
| $^{58}Ni(n,p)^{58}Co$ | 5.26E−17 | 5.29E−17 | 0.99 | 1.38E−16 | 1.39E−16 | 0.99 |
| $^{238}U(n,f)^{137}Cs$ | 2.18E−16 | 2.22E−16 | 0.98 | 5.54E−16 | 5.84E−16 | 0.95 |
| $^{237}U(n,f)^{137}Cs$ | 3.41E−15 | 3.65E−15 | 0.93 | 8.48E−15 | 9.77E−15 | 0.87 |
| $^{63}Cu(n,\alpha)^{60}Co$ | 3.86E−19 | 3.96E−19 | 0.98 | 9.86E−19 | 9.12E−19 | 1.08 |
| $^{54}Fe(n,p)^{54}Mn$ | 3.37E−17 | 3.62E−17 | 0.93 | 8.45E−17 | 8.31E−17 | 1.02 |
| $^{58}Ni(n,p)^{58}Co$ | 5.36E−17 | 5.23E−17 | 1.03 | 1.22E−16 | 1.20E−16 | 1.02 |
| $^{238}U(n,f)^{137}Cs$ | 2.19E−16 | 2.19E−16 | 1.00 | 5.05E−16 | 4.98E−16 | 1.01 |
| $^{237}U(n,f)^{137}Cs$ | 3.43E−15 | 3.60E−15 | 0.95 | 8.16E−15 | 8.34E−15 | 0.98 |
| $^{63}Cu(n,\alpha)^{60}Co$ | 7.45E−19 | 8.10E−19 | 0.92 | 7.15E−19 | 7.38E−19 | 0.97 |
| $^{54}Fe(n,p)^{54}Mn$ | 6.53E−17 | 7.03E−17 | 0.93 | 5.48E−17 | 6.32E−17 | 0.87 |
| $^{58}Ni(n,p)^{58}Co$ | 9.04E−17 | 1.00E−16 | 0.90 | 8.08E−17 | 8.99E−17 | 0.9 |
| $^{238}U(n,f)^{137}Cs$ | 3.72E−16 | 4.02E−16 | 0.92 | 3.29E−16 | 3.55E−16 | 0.93 |
| $^{237}U(n,f)^{137}Cs$ | 6.10E−15 | 6.49E−15 | 0.94 | 5.18E−15 | 5.70E−15 | 0.91 |

What is claimed is:

1. A computer-implemented method for simulating a three dimensional radiation field distribution of neutron and gamma radiation in a nuclear reactor to calculate ex-vessel dosimetry responses, the nuclear reactor comprising a reactor vessel and a reactor core, said method comprising:
   generating a geometrical model of the reactor core;
   generating a material distribution of the reactor core;
   calculating the neutron and gamma radiation using a radiation transport methodology, the transport methodology comprising:
      calculating a distribution of particles throughout a phase space by generating a solution of the Linearized Boltzmann Equation (LBE) which includes solving discrete ordinates method ($S_N$) equations;
      generating a solution to the $S_N$ equations on 3-D Cartesian or cylindrical geometries using domain decomposition algorithm methodology, the algorithm methodology comprising:
         partitioning angular and spatial domains of the phase space into subsets;
         allocating independently the subsets to a plurality of processors; and
         processing the subsets on the plurality of processors.

2. The method of claim 1 wherein said nuclear reactor is a 2-loop pressurized water reactor.

3. The method of claim 1 wherein said plurality of processors comprises a number of physically independent workstations linked together by a network connection.

4. The method of claim 1 wherein said partitioning of said angular and spatial domains includes using parallel memory on the plurality of processors.

5. The method of claim 1 wherein said radiation field distribution includes ex-vessel neutron dosimetry responses in a nuclear reactor cavity of a pressurized water reactor.

6. The method of claim 5 wherein said dosimetry responses are obtained on a 3-D Cartesian geometry.

7. The method of claim 1 wherein said algorithms are structured to solve concurrently $S_N$ equations using parallel algorithms.

8. The method of claim 1 wherein each of the plurality of processors locally accesses its own devices selected from the group consisting of storage device and local memory.

9. The method of claim 1 further comprising partitioning said energy domain into a number of discrete intervals.

10. The method of claim 1 further comprising partitioning said spatial domain into computational cells.

11. The method of claim 10 wherein an assumed cross section within each of the computational cells is constant.

12. The method of claim 1 wherein the angular and spatial domains are concurrently partitioned.

13. The method of claim 12 wherein the number of processors is up to and including 20.

14. The method of claim 13 wherein the radiation field distribution is generated in a time period of less than two hours.

15. The method of claim 13 wherein a solution derived by using said method has an accuracy of 90% or greater.

* * * * *